J. S. CROSLAND.
ROPE CLIP.
APPLICATION FILED MAY 2, 1911.
1,029,345.
Patented June 11, 1912.
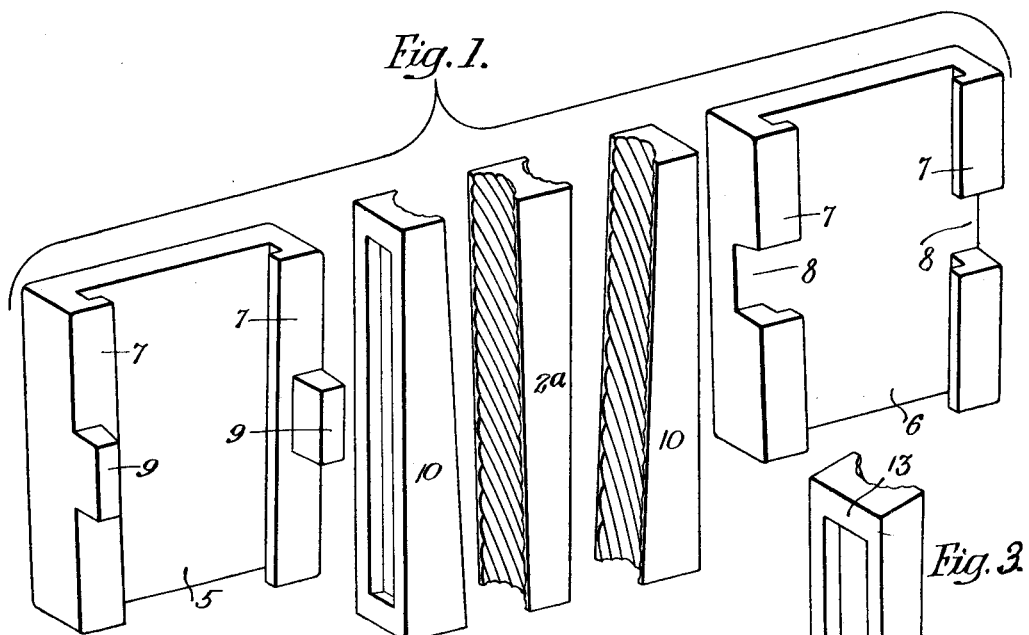
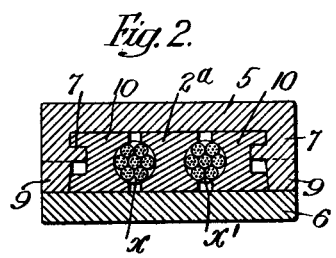
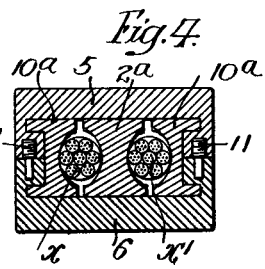
Inventor
John S. Crosland.
by his Attorneys
Howson + Howson

UNITED STATES PATENT OFFICE.

JOHN S. CROSLAND, OF TRENTON, NEW JERSEY.

ROPE-CLIP.

1,029,345.  Specification of Letters Patent.  Patented June 11, 1912.

Application filed May 2, 1911. Serial No. 624,628.

*To all whom it may concern:*

Be it known that I, JOHN S. CROSLAND, a citizen of the United States, and a resident of Trenton, New Jersey, have invented certain Improvements in Rope-Clips, of which the following is a specification.

One object of my invention is to provide a rope clip of the type designed to hold together two parallel lengths of rope or cable to form a loop or for any other purpose; it being particularly desired that the clip according to my invention shall be simple, substantial and durable as to its construction, conveniently applicable to and removable from the rope with which it is used, and relatively inexpensive as well as reliable under conditions of use. These objects and other advantageous ends I secure as hereinafter set forth, reference being had to the accompanying drawings, in which:—

Figure 1, is a detached perspective illustrating my invention; Fig. 2, is a horizontal section of the clip illustrated in Fig. 1; Fig. 3, is a perspective view of a slightly modified form of holding member of the general type shown in Fig. 1; and Fig. 4, is a horizontal section of a slightly modified form of inclosing casing.

In Figs. 1 and 2 of the above drawings there is shown a casing made in two pieces 5 and 6, each consisting of a flat plate provided with edge flanges 7, overhung or extended toward each other so as to provide interior grooves. In order to properly position these two parts to prevent their relative longitudinal movement, the part 6 is provided with recesses 8 in its flanges, while the member 5 is provided with lugs or projections 9 also forming part of its flanges and designed to fit said recesses. When these two members 5 and 6 are placed together in the positions shown in Fig. 2, the overhung parts of their flanges lie immediately adjacent each other and there is formed a clip structure or casing having a passage or cavity which tapers from one end to the other. The two members 5 and 6 are held or clamped together by means of two wedge shaped pieces 10 of channel section, each of which engages the overhung parts of two adjacent flanges 7; the ends of the recesses in these pieces being closed by transverse portions 12 and 13. In addition, one face of each of the wedges is made concave and is preferably provided with spiral corrugations so as to closely grip a rope or cable. A central wedge 2$^a$ is also provided and this, in addition to having its opposite faces concaved or recessed so as to fit the rope, likewise has said faces spirally corrugated as shown.

Under operating conditions the two members 5 and 6 of the clip are placed together so that their longitudinal movement is prevented by the entrance of the lugs 9 into the recesses 8. Thereafter their separation is prevented by means of the wedge shaped holding pieces 10 and after the two lengths of rope to be connected or held together have been inserted or said members have been placed around said rope and then connected, as shown in Fig. 2, the wedge piece 2$^a$ is put in place, so that it acts to prevent the two rope sections from moving longitudinally out of the clip under any conditions found in practice.

It may be noted that under test the wire cable or rope breaks before any failure occurs in the various parts of the clip. As is obvious, when it is desired to remove the clip from the rope, the wedge 2$^a$ is easily driven back, thereby releasing the other parts of the device. In place of the lug and recess connection shown in Figs. 1 and 2, I may mount dowel pins 11 in one of the members as 5, and provide corresponding holes or recesses for their reception in the member 6, as shown in Fig. 4. If considered advisable, the holding members may be constructed as illustrated in Figs. 3 and 4 with their sides substantially parallel instead of tapering, in which case the central member 2$^a$ would be wedge-shaped.

It will be noted that with the construction above described the clip may be very easily and conveniently applied to or removed from a rope and by reason of the arrangement of parts will not under conditions of use, become loosened or inoperative.

I claim:—

A rope clip consisting of a casing made in two parts having flanges; two pieces of channel-shaped section having closed ends and formed to fit said flanges to prevent separation of the said two casing parts; with a holding member formed to fit between two bodies of rope passing through the casing.

In testimony whereof, I have signed my name to this specification, in the presence of two subscribing witnesses.

JOHN S. CROSLAND.

Witnesses:
JOHN T. HOLKROFT,
JOHN KENNEDY.